(12) United States Patent
Meng et al.

(10) Patent No.: US 9,354,938 B2
(45) Date of Patent: May 31, 2016

(54) SEQUENTIAL COOPERATION BETWEEN MAP AND REDUCE PHASES TO IMPROVE DATA LOCALITY

(71) Applicant: International Business Machines Corporation, Armonk, NY (US)

(72) Inventors: Shicong Meng, Yorktown Heights, NY (US); Xiaoqiao Meng, Yorktown Heights, NY (US); Jian Tan, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 13/860,073

(22) Filed: Apr. 10, 2013

(65) Prior Publication Data

US 2014/0310712 A1    Oct. 16, 2014

(51) Int. Cl.
*G06F 9/46* (2006.01)
*G06F 9/50* (2006.01)

(52) U.S. Cl.
CPC ........ *G06F 9/5066* (2013.01); *G06F 2209/502* (2013.01)

(58) Field of Classification Search
None
See application file for complete search history.

(56) References Cited

U.S. PATENT DOCUMENTS

| | | | |
|---|---|---|---|
| 7,970,872 B2 | 6/2011 | Liu et al. | |
| 8,135,718 B1 | 3/2012 | Das et al. | |
| 8,209,695 B1 | 6/2012 | Pruyne et al. | |
| 8,230,070 B2 | 7/2012 | Buyya et al. | |
| 8,732,720 B2 | 5/2014 | Verma et al. | |
| 2003/0187907 A1 | 10/2003 | Ito | |
| 2007/0143765 A1 | 6/2007 | Aridor et al. | |
| 2008/0133474 A1 | 6/2008 | Hsiao et al. | |
| 2008/0263559 A1 | 10/2008 | Das et al. | |
| 2010/0094828 A1 | 4/2010 | Mehta et al. | |
| 2010/0281166 A1 | 11/2010 | Buyya et al. | |
| 2010/0293551 A1 | 11/2010 | Ajima et al. | |
| 2011/0119680 A1 | 5/2011 | Li et al. | |
| 2011/0154341 A1 | 6/2011 | Pueyo et al. | |
| 2011/0167149 A1 | 7/2011 | Lee et al. | |
| 2011/0282982 A1 | 11/2011 | Jain | |
| 2012/0042319 A1 | 2/2012 | Hildrum et al. | |

(Continued)

FOREIGN PATENT DOCUMENTS

| | | |
|---|---|---|
| WO | 2011153242 | 6/2011 |
| WO | 2012027478 | 8/2011 |

OTHER PUBLICATIONS

Anathanarayanan, G., et al., "Reining the Outliers in Map-Reduce Clusters using Mantri", Microsoft Research Technical Report, Jun. 2010, 24 pages, Techical Report MSR-TR-2010-69, Microsoft Corporation, Redmond, Washington, USA.

(Continued)

*Primary Examiner* — Mengyao Zhe
(74) *Attorney, Agent, or Firm* — Ference & Associates LLC

(57) ABSTRACT

Methods and arrangements for task scheduling. A job is accepted, the job comprising a plurality of phases, each of the phases comprising at least one task. For each of a plurality of slots, a fetching cost associated with receipt of one or more of the tasks is determined. The slots are grouped into a plurality of sets. A pair of thresholds is determined for each of the sets, the thresholds being associated with the determined fetching costs and comprising upper and lower numerical bounds for guiding receipt of one or more of the tasks. Other variants and embodiments are broadly contemplated herein.

9 Claims, 7 Drawing Sheets

(56) References Cited

U.S. PATENT DOCUMENTS

| | | |
|---|---|---|
| 2012/0110047 A1 | 5/2012 | Hildrum et al. |
| 2012/0151292 A1 | 6/2012 | Rowstron et al. |
| 2012/0198466 A1 | 8/2012 | Cherkasova et al. |
| 2012/0226639 A1 | 9/2012 | Burdick et al. |
| 2012/0284727 A1 | 11/2012 | Kodialam et al. |
| 2012/0330864 A1 | 12/2012 | Chakrabarti et al. |
| 2013/0024012 A1 | 1/2013 | Ballintine et al. |
| 2013/0024412 A1 | 1/2013 | Gong et al. |
| 2013/0031558 A1 | 1/2013 | Balmin et al. |
| 2013/0104135 A1 | 4/2013 | Cai et al. |
| 2013/0104140 A1 | 4/2013 | Meng et al. |
| 2013/0268941 A1 | 10/2013 | Cherkasova et al. |
| 2013/0290976 A1 | 10/2013 | Cherkasova et al. |
| 2014/0019987 A1 | 1/2014 | Verma et al. |
| 2014/0215487 A1 | 7/2014 | Cherkasova et al. |

OTHER PUBLICATIONS

Dean, J., et al., "MapReduce: Simplified Data Processing on Large Clusters", Communications of the ACM, 50th Anniversary Edition, Jan. 2008, vol. 51, Issue 1, pp. 107-113, ACM, New York, New York, USA.

Hammoud, M., et al., "Locality-Aware Reduce Task Scheduling for MapReduce", 2011 IEEE Third International Conference on Cloud Computing Technology and Science (CloudCom), Athens, Greece, Nov. 29-Dec. 1, 2011, 7 pages, available online at .qatar.cmu.edu/~mhhammou/mhh_msakr_LARTS_CloudCom2011_paper.pdf, as of Apr. 8, 2013.

Hindman, B., et al., "Mesos: A Platform for Fine-Grained Resource Sharing in the Data Center", Technical Report, University of California, Berkeley, Sep. 30, 2010, 14 pages, available online at mesos.berkeley.edu/mesos_tech_report.pdf, as of Apr. 8, 2013.

Isard, M., et al., "Dryad: Distributed Data-Parallel Programs from Sequential Building Blocks", 2nd ACM SiGOPS/EuroSys European Conference on Computer Systems, Mar. 21-23, 2007, 14 pages, ACM, Lisboa, Portugal.

Zaharia, M., et al., "Improving MapReduce Performance in Heterogeneous Environments", Proceedings of the 8th USENIX conference on Operating systems Design and Implementaion (OSDI'08), San Diego, California, USA, Dec. 8-10, 2008, 14 pages, available online at http://static.usenix.org/events/osdi08/tech/full_papers/zaharia/zaharia.pdf, as of Apr. 8, 2013.

Palanisamy, B., et al., "Purlieus: Locality-aware Resource Allocation for MapReduce in a Cloud", Proceedings of 2011 International Conference for High Performance Computing, Networking, Storage and Analysis, SC'11, Nov. 12-18, 2011, 11 pages, ACM, Seattle, Washington, USA.

Verma, A., et al., "ARIA: Automatic Resource Inference and Allocation for MapReduce Environments", HP Laboratories, Report HPL-2011-58, approved for publication in 8th IEEE International Conference on Autonomic Computing (ICAC'2011), Jun. 14-18, 2011, 11 pages, IEEE, Karsruhe, Germany.

Wolf, J., et al., "FLEX: A Slot Allocation Scheduling Optimizer for MapReduce Workloads", Middleware 2010, vol. 6452 of Lecture Notes in Computer Science; 20 pages, Springer Berlin/Heidelberg, Germany.

Zaharia, M., et al., "Job Scheduling for Multi-User MapReduce Clusters", Electrical Engineering and Computer Sciences, University of California at Berkeley, Technical Report, No. UCB/EECS-2009-55, Apr. 30, 2009, 14 pages, University of California At Berkeley; Berkeley, California, USA.

Lin, Jimmy et al., "Of Ivory and Smurfs: Loxodontan MapReduce Experiments for Web Search", Nov. 2009, TREC 2009 DTIC Document, 12 pages, University of Maryland, USA.

Wang, Xiaowei et al., "Dynamic Split Model of Resource Utilization in MapReduce", DataCloud-SC'11, Nov. 14, 2011, 10 pages, Seattle, Washington, USA.

Isard, Michael et al., "Quincy: Fair Scheduling for Distributed Computer Clusters", SOSP'09, Oct. 11-14, 2009, 16 pages, Big Sky, Montana, USA.

Zaharia, Matei et al., "Delay Scheduling a Simple Technique for Achieving Locality and Fairness in Cluster Scheduling", In Eurosys, Apr. 2010, 30 pages, Paris, France.

Dean, Jeffrey et al., "MapReduce: Simplified Data Processing on Large Clusters," OSDI'04 Technical Program, Oct. 3, 2004. db2.usenix.org/events.osdi04/tech/full_papers/dean/dean_html/ as of Apr. 2, 2013.

Derman, Cyrus et al., "A Sequential Stochastic Assignment Problem," Management Science, Mar. 1972, 8 pages, vol. 18, No. 7, Informs, Institute for Operations Research and the Management Sciences. Publisher contact http://www.jstor.org.action/showPublisher:publisherCode=informs.

Polo, Jorda et al., "Resource-aware Adaptive Scheduling for MapReduce Clusters," Proceedings of the 12th ACM/IFIP/USENIX International Conference on Middleware, Lisboa, Portugal, Dec. 12-16, 2011, 20 pages. http://people.ac.upc.edu/dcarrera/papers/MIDDLEWARE11.pdf as of Apr. 9, 2013.

Sandholm, Thomas et al., "Dynamic Proportional Share Scheduling in Hadoop," JSSPP 2010, pp. 110-131, Springer-Verlag Berlin Heidelberg, Germany.

Guo, Zhenhua et al., "Investigation of Data Locality in MapReduce," Proceedings of the 2012 12th IEEE/ACM International Symposium on Cluster, Cloud and Grip Computing, CCGRID'12, Ottawa, Canada, May 13-16, 2012, 8 pages. grids.ucs.indiana.edu/pt/iupages/publications/InvestigationDataLocalityInMapReduce_CCGrid12_Submitted.pdf as of Apr. 3, 2013.

Tan, Jian et al., "Performance Analysis of Computing Scheduler for MapReduce/Hadoop," Proceedings IEEE INFOCOM, 2012, Orlando, Florida, USA, Mar. 25-30, 2012, 5 pages. chinacloud.cn/upload/2012-01/12011616302763.pdf as of Apr. 3, 2013.

Kavulya, Soila et al., "An Analysis of Traces from a Production MapReduce Cluster," CMU-PDL-09-107, Parallel Data Laboratory, Carnegie Mellon University, Dec. 2009, 18 pages, Carnegie Mellon University, Pittsburgh, Pennsylvania, USA.

Condie, Tyson et al., "MapReduce Online," Proceedings of the 7th USENIX Conference on Networked Systems Design and Implementation, NSDI'10, San Jose, California, USA, Apr. 28-30, 2010, 15 pages. db.cs.berkeley.edu/papers/nsdi10-hop.pdf as of Apr. 3, 2013.

Wang, Yandong, "Hadoop Acceleration Through Network Levitated Merge," SC11, Seattle, Washington, USA, Nov. 12-18, 2011, 10 pages, ACM Digital Library.

Dai, Jinquan et al., "HiTune: Dataflow-Based Performance Analysis for Big Data Cloud," Proceedings 3rd USENIX Workshop on Hot Topics in Cloud Computing, Portland, Oregon, USA, Jun. 14-15, 2011, 14 pages, http://static.usenix.org/events/atc11/tech/find_files/Dai.pdf as of Apr. 3, 2013.

Schwazkopf, Malte et al., "The seven deadly sins of cloud computing research," Proceedings HotCloud'12, 4th Usenix Workshop on Hot Topics in Cloud Computing, Boston, Massachusetts, USA, Jun. 12-13, 2012, 5 pages. https://www.usenix.org/conference/hotcloud12/seven-deadly-sins-cloud-computing research as of Apr. 3, 2013.

Teng, Fei et al., "Scheduling Performance of Real-Time Tasks on MapReduce Cluster," Proceedings of the International Conference on Human-centric Computing 2011 and Embedded and Multimedia Computing 2011, pp. 365-374, Springer Science+Business Media B.V., Netherlands, 2011.

Zaharia, Matei et al., "Job Scheduling for Multi-User MapReduce Clusters," Technical Report No. UCB/EECS-2009-55, Apr. 30, 2009, 18 pages, Electrical Engineering and Computer Sciences, University of California at Berkeley, .eecs.berkeley.edu/Pubs/TechRpts/2009/EECS-2009-55.pdf.

Chen, Fangfei et al., "Joint Scheduling of Processing and Shuffle Phases in MapReduce Systems," Proceedings of 31st Annual IEEE INFOCOM Conference, Orlando, Florida, USA, Mar. 25-30, 2012, pp. 1143-1151, IEEE Digital Library.

IP.com, "Optimizing MapReduce Scheduling at the Task-Level," Prior Art Database Technical Disclosure, IPCOM000217108D, May 3, 2012, 6 pages.

Wierman, Adam et al., "Classifying Scheduling Policies with Respect to Unfairness in an M/GI/1." SIGMETRICS'03, San Diego, California, USA, Jun. 10-14, 2003, 12 pages, ACM Digital Library.

Polo, Jorda, et al., "Performance-Driven Task Co-Scheduling for MapReduce Environments", Network Operations and Management Symposium (NOMS), 2010 IEEE, Apr. 19-23, 2010, 8 pages, Osaka, Japan.

SEQUENTIAL COOPERATION BETWEEN MAP AND REDUCE PHASES TO IMPROVE DATA LOCALITY

BACKGROUND

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Generally, MapReduce has emerged as a dominant paradigm for processing large datasets in parallel on compute clusters. As an open source implementation, Hadoop has become popular in a short time for its success in a variety of applications, such as social network mining, log processing, video and image analysis, search indexing, recommendation systems, etc. In many scenarios, long batch jobs and short interactive queries are submitted to the same MapReduce cluster, sharing limited common computing resources with different performance goals. It has thus been recognized that, in order to meet these imposed challenges, an efficient scheduler can be helpful if not critical in providing a desired quality of service for the MapReduce cluster.

Generally, it has been recognized that improving data locality for MapReduce jobs can be critical for the performance of large-scale Hadoop clusters, embodying the principle of moving computation close to data for big data platforms. Scheduling tasks in the vicinity of stored data can significantly diminish network traffic, which is crucial for system stability and efficiency. Though issues of data locality have been investigated extensively for map tasks, most conventional schedulers ignore data locality for reduce tasks when fetching the intermediate data, causing performance degradation.

Such a problem of reducing the fetching cost for reduce tasks has been identified recently. However, solutions proposed in that connection are exclusively based on a greedy approach, relying on the intuition to place reduce tasks to the slots that are closest to the majority of the already generated intermediate data. The consequence is that, in presence of job arrivals and departures, assigning the reduce tasks of the current job to the nodes with the lowest fetching cost can prevent a subsequent job with even better match of data locality from being launched on the already taken slots.

BRIEF SUMMARY

In summary, one aspect of the invention provides a method comprising: accepting a job, the job comprising a plurality of phases, each of the phases comprising at least one task; determining, for each of a plurality of slots, a fetching cost associated with receipt of one or more of the tasks; grouping the slots into a plurality of sets; determining a pair of thresholds for each of the sets, the thresholds being associated with the determined fetching costs and comprising upper and lower numerical bounds for guiding receipt of one or more of the tasks.

Another aspect of the invention provides an apparatus comprising: at least one processor; and a computer readable storage medium having computer readable program code embodied therewith and executable by the at least one processor, the computer readable program code comprising: computer readable program code configured to accept a job, the job comprising a plurality of phases, each of the phases comprising at least one task; computer readable program code configured to determine, for each of a plurality of slots, a fetching cost associated with receipt of one or more of the tasks; computer readable program code configured to group the slots into a plurality of sets; and computer readable program code configured to determine a pair of thresholds for each of the sets, the thresholds being associated with the determined fetching costs and comprising upper and lower numerical bounds for guiding receipt of one or more of the tasks.

An additional aspect of the invention provides a computer program product comprising: a computer readable storage medium having computer readable program code embodied therewith, the computer readable program code comprising: computer readable program code configured to accept a job, the job comprising a plurality of phases, each of the phases comprising at least one task; computer readable program code configured to determine, for each of a plurality of slots, a fetching cost associated with receipt of one or more of the tasks; computer readable program code configured to group the slots into a plurality of sets; computer readable program code configured to determine a pair of thresholds for each of the sets, the thresholds being associated with the determined fetching costs and comprising upper and lower numerical bounds for guiding receipt of one or more of the tasks.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
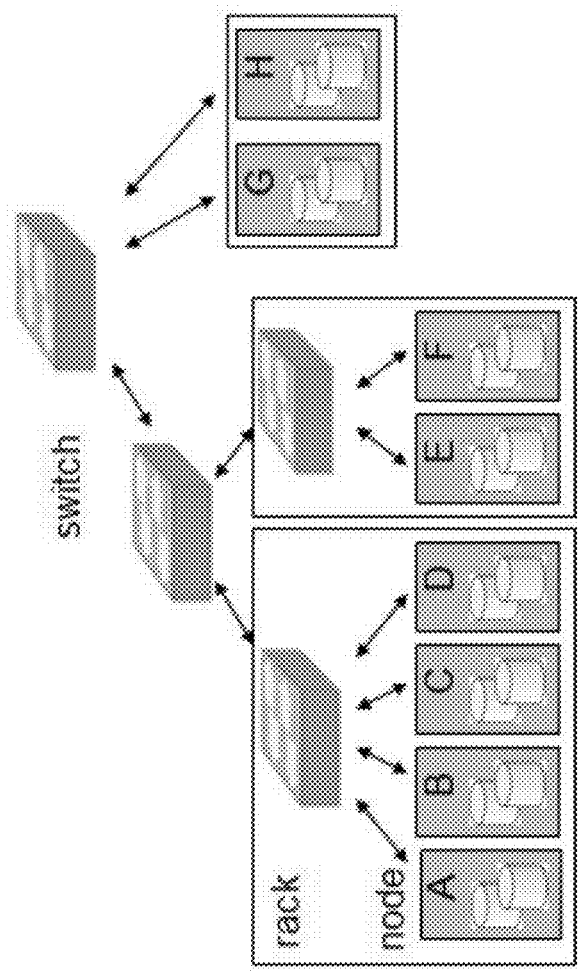
FIG. 1 schematically illustrates a Hadoop tree topology.

For further background information, including details relating to at least one environment or context in which embodiments of the invention may be employed, incorporated herein by reference, as if set forth in there entirety herein, are co-pending and commonly assigned U.S. patent application Ser. No. 13/278,383, entitled "Resource Aware Scheduling In a Distributed Computing Environment", filed Oct. 21, 2011, inventors Xiaoqiao Meng et al., as well as U.S. patent application Ser. No. 13/525,778, entitled "Sequential Cooperation Between Map and Reduce Phases to Improve Data Locality", filed Jun. 22, 2012, inventors Xiaoqiao Meng et al.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, is a stochastic optimization framework which improves data locality for reduce tasks, with an optimal placement policy exhibiting a threshold-based structure. In order to ease implementation, there is also proposed herein a receding horizon control policy based on the optimal solution under restricted conditions.

By way of general background, for a Hadoop cluster, a master JobTracker is responsible for handling complicated data distribution, tasks assignment and fault-tolerance. It divides a MapReduce job into two types of tasks, map tasks (MapTasks) and reduce tasks (ReduceTasks), and assigns tasks to multiple workers called TaskTrackers for parallel data processing.

MapTasks are short and independent, launched in waves to process data splits. MapTasks from different jobs can share the common computing resources, e.g., the same pool of map "slots". Differently, ReduceTasks have long execution times that can overlap with the whole process of the map phase, since a reduce task needs to fetch the intermediate data from every map task through the copy/shuffle phase. A ReduceTask is launched almost immediately when its map tasks start. Once it is launched, it stays with the reduce slot until the completion. Therefore, the copy/shuffle phase of the reduce tasks happens at the same time when the map tasks of the same job are in processing. Only after a reduce task fetches all the intermediate data can it start the real reduce function.

Generally, Hadoop can limit the number of jobs that run simultaneously. For example, the following Hadoop cluster supports at most 50 jobs at the same time by setting up the following configuration:

```
<pool name="admin">
<maxRunningJobs> 50 </maxRunningJobs>
</pool>.
```

Generally, in addition, Hadoop needs to configure the number of map and reduce slots for each worker (or slave) node. Each slot can grant a single task to run at any time. The JobTracker assigns available MapTasks and ReduceTasks separately from jobs in the queue to available map slots and reduce slots, respectively, one task per slot. For example, the number of reduce tasks that can run simultaneously can be specified by the following parameter:

<name>mapred.tasktracker.reduce.tasks.maximum</name>.

Generally, conventional efforts have not been able to address a problem of improving copy/shuffle performance for sequential jobs through placing reduce tasks. As such, in accordance with at least one embodiment of the invention, to quantify the cost of moving intermediate data, there is introduced the concept of fetching cost. Hadoop assumes a tree topology G=(V,E) that comprises a set V of nodes and a set E of edges. A typical example is illustrated in FIG. 1. Denote by h(u,v) the hop distance between node u and v, and by X(u) the size of the intermediate data stored on node u for a ReduceTask. When transferring the stored data on node u to node v, the network cost is proportional to X(u) h(u,v). Thus, one can define the total network cost of transferring all stored intermediate data to a ReduceTask that is placed on node v by $$C = \sum_{u \in V} X(u) h(u, v).$$

If X(u) are evenly distributed on all the nodes X(u)≡X, then there is yielded $$C = X\left(\sum_{u \in V} h(u, v)\right),$$

where $$\sum_{u \in V} h(u, v)$$

@H(v) represents the accumulated hop distances for a node v. Therefore, H(v) will henceforth be referred to as an indicator of the fetching cost per bit due to network topology. In general, this cost can also depend on the uneven distribution of the intermediate data. Furthermore, since the involved switches may have different speeds, one can instead use weighted hop distances accordingly.

With continued reference to FIG. 1 in accordance with at least one embodiment of the invention, and by way of illustrative example, there can be calculated the accumulated hop distances for node A and G, H(A)=13 and H(G)=19 as follows:

$$H(A) = h(A, B) + h(A, C) + h(A, D) + h(A, E) + h(A, F) + h(A, G) + h(A, H)$$
$$= 1 + 1 + 1 + 2 + 2 + 3 + 3$$
$$= 13.$$

It can be noted that the actual network topology of a Hadoop cluster can be much more complicated, especially when Hadoop nodes run on scattered virtual machines. For instance, when deploying a virtualized Hadoop cluster in a Infrastructure-as-a-Service Cloud environment (e.g., Amazon EC2) where tens of thousands of servers are inter-connected with hierarchical network and virtual machines are randomly chosen for users, the number of hops between any two nodes (a.k.a. virtual machines) can be very different. As a result, the cost of data transferring also varies heavily across different Hadoop nodes. The fetching cost per bit H(v) of a node v essentially provides a measure of the quality so that one can compare the performance of different nodes in a quantitative manner. With this being said, a value from a given set can be assigned to a working node by monitoring its performance, e.g., when the topology information is not directly available in a cloud environment.

Figure 2:
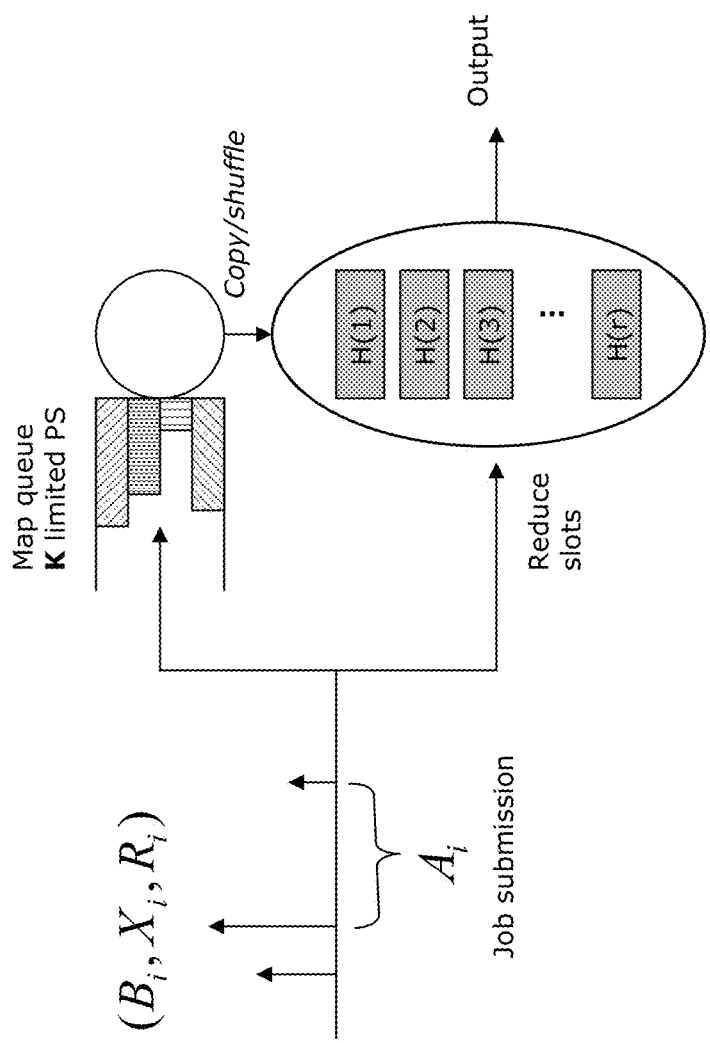
FIG. 2 schematically illustrates a scheduling model for MapReduce.

In accordance with at least one embodiment of the invention, FIG. 2 schematically illustrates a scheduling model for MapReduce.

In accordance with at least one embodiment of the invention let it be assumed that a cluster can run at most K number of jobs simultaneously and the cluster has r number of reduce slots indexed by the list (1, 2, L, r). Upon the submission of job i, its map workload (which includes multiple MapTasks) joins the map queue and its ReduceTasks join the reduce queue at the same time, as shown in FIG. 2. An advantageous scenario can be explored whereby any job in service can claim the required number of reduce slots immediately after the map phase of this job receives service. This can ensure an efficient processing of the submitted MapReduce jobs since the copy/shuffle phase effectively overlaps with its map phase. One sufficient way is to configure the total number r of reduce slots in the cluster greater than or equal to $K\bar{r}$, where $\bar{r}$ is the maximum number of ReduceTasks for any job. In practice, there are rules of thumb to guide the configuration of the number of reduce slots such that it can match with the number of map slots and the workload injected to the MapReduce cluster. Let $A_i$ be the time interval between the arrival points of job i and i−1.

In accordance with at least one embodiment of the invention, for Map tasks, denote by $B_i$ the total workload for the MapTasks of job i, which is measured by the time taken to process the map phase of job i without other jobs present in the system. It is recognized that under Fair Scheduler, the map phases of every job in service get the same share of map slots. Since there are at most K jobs in service simultaneously, the map phase can be modeled by the K limited processor sharing discipline.

In accordance with at least one embodiment of the invention, K limited processor sharing can be defined as follows. For a queue that serves jobs according to their arrival times with at most K jobs simultaneously in service at any time, each job in service is attended with 1/min(n(t), K) fraction of capacity, assuming n(t)≥1 jobs in queue at time t. If n(t)>K then n(t)−K jobs need to wait in the queue.

In accordance with at least one embodiment of the invention, for ReduceTasks, it can be noted that the reduce phase is modeled by a multi-server queue. Job i claims a random $R_i, 1 \le R_i \le \bar{r}$ number of reduce slots immediately upon its arrival, and the reduce phase overlaps with the map phase. Denote by $X_i$ the total amount of intermediate data that needs to be fetched by the ReduceTasks of job i. Let $X_i^j, 1 \le j \le R_i$ be the amount of intermediate data shipped to the jth reducer of job i; clearly $$\sum_{j=1}^{R_i} X_i^j = X_i.$$

If $X_i^j$ are equal then $X_i^j = X_i/R_i$. It can be noted that the performance bottleneck is in the copy/shuffle phase and the map phase. Therefore, in the present illustrative example of a model, it can be assumed that the time to process the real reduce function can be neglected for ReduceTasks.

By way of another definition, in accordance with at least one embodiment of the invention, assume that $\{B_i\}_{i > -\infty}$, $\{X_i\}_{i > -\infty}$ and $\{R_i\}_{i > -\infty}$ are three sequences of mutually independent i.i.d. random variables that are also independent from all other random variables, with $$B_i^d = B, \ X_i^d = X \ \text{and} \ R_i^d = R.$$

As such, in accordance with at least one embodiment of the invention, the assumption that $B_i$ is independent of $X_i$ is to ease analysis; it is also recognized that they can be correlated. A beneficial consequence of this correlation is that carefully placing the ReduceTasks can not only decrease the fetching cost but also speed up the job processing.

In accordance with at least one embodiment of the invention, in order to improve system performance, ReduceTasks are placed on nodes such that the total fetching cost is minimized. In this regard, two different scenarios can be studied. First, one can consider a case when the job processing time is much longer than the job arrival interval. This problem can be related to a classic stochastic sequential assignment problem. Secondly, one can investigate a more realistic case when jobs arrive and depart. After a job leaves the system, it will release the occupied reduce slots, which can be further taken by later jobs. Let $\xi_i(j)$ be the index of the reduce slot where the jth ReduceTask ($1 \leq j \leq R_i$) of job i is placed.

In accordance with at least one embodiment of the invention, an assignment of K sequential jobs with infinite service time can be illustrated. As such, when the job processing times are very long, e.g., $B_i = \infty$, the system can only process K MapReduce jobs. Therefore, on may consider the problem of minimizing the fetching cost incurred by the first K jobs with the system initially being empty. Specifically, minimize $$E\left[\sum_{i=1}^{K}\sum_{j=1}^{R_i} X_i^j H(\xi_i(j))\right]. \quad (1)$$

Under either of the following two assumptions: 1) $X_i^j = X_i/R_i$, or 2) $\{X_i^j\}_{i \leq j \leq R_i}$ are i.i.d. (independently and identically distributed) conditional on $R_i$ for each fixed i, the objective (1) is equivalent to $$E\left[\sum_{i=1}^{K} \frac{X_i}{R_i} \sum_{j=1}^{R_i} H(\xi_i(j))\right]. \quad (2)$$

When the ith job arrives, $1 \leq i \leq K$, it sees a number of available reduce slots, which is denoted by the list $L(i)=(i_1, i_2, L\, i_{l(i)})$ of length $l(i)$ with the corresponding accumulated hop distances $H_i(1) \leq H_i(2) \leq L \leq H_i(l(i))$. The condition $K\bar{r} \geq r$ ensures that $l(i) \geq (K-i+1)\bar{r}$ for all $1 \leq i \leq K$. Therefore, one only need consider the first $(K-i+1)\bar{r}$ reduce slots in the list $L(i)$. Equivalently, one can just assume that $l(i)=(K-i+1)\bar{r}$.

In accordance with at least one embodiment of the invention, it is recognized that for each $1 \leq i \leq K$ with $l(i)$ empty reduce slots, there exist $\infty = q_{0,i} \geq q_{1,i} \leq L \leq q_{l(i+1)+1,i} = -\infty$, that are independent of $H_i(j)$, such that when $q_{y,i} > X_i/R_i \geq q_{y+1,i}$ the optimal placement that minimizes (2) is to assign the $R_i$ number of ReduceTasks to the slots indexed by $i_y, i_{y+1}, L, i_{y+R_i}$ in the list $L(i)$ when job i arrives. "Hardy's Lemma" can help illustrate these considerations, as follows: If $X_1 \geq X_2 \geq L \geq X_n$ and $H(1) \leq H(2) \leq L \leq H(n)$ are two sequences of numbers, then for any permutation $\sigma(1), \sigma(2), L, \sigma(n)$ of 1, 2, L, n, there is yielded:

$$\sum_{i=1}^{n} H(i)X_i \leq \sum_{i=1}^{n} H(\sigma(i))X_i. \quad (3)$$

In accordance with at least one embodiment of the invention, there can be defined the total expected fetching cost $C_{i \to K}(H(i_1), H(i_2), L, H(i_l))$ for jobs i, L, K, $1 \leq i \leq K$ under an optimal ReduceTask placement policy when job i sees the set of available slots with accumulated hop distances $H_i(1), H_i(2), L, H_i(l(i))$. Correspondingly one can define the conditional expected fetching cost $C_{i \to K}^{x,v}$ conditional on the event that $X_i = x$ and $R_i = v$ under an optimal policy.

To prove the theorem set forth just above, in accordance with at least one embodiment of the invention, a proof can be based on induction, starting from i=K back to i=1. Proceeding with the case i=K, the optimal placement is to assign the ReduceTasks of job K to the first $R_K$ slots in $L_K=(K_1, K_2, L, K_{l(K)})$ that have the smallest accumulated hop distances. Therefore, one can set $q_{0,K}=\square$ and $q_{1,K}=-\infty$ since $l(K+1)=0$.

In accordance with at least one embodiment of the invention, let it be assumed that the results are true for all i>n. Specifically, there exist numbers $\{q_{u,i}\}_{1 \leq u \leq l(i+1)+1}$ that are independent of $H_i(j)$, $1 \leq j \leq l(i)$ for all i>n, $1 \leq n \leq K$, such that the optimal placement is to assign the $R_i$ number of ReduceTasks to the slots indexed by $i_y, i_{y+1}, L, i_{y+R_i}$ in the list $L(i)$ when $q_{0,y} < X_i/R_i \leq q_{0,y+1}$. Then, when job n arrives, bringing $R_n = r_n$ ReduceTasks and $X_n = x_n$ intermediate data, there is obtained, for any subsequence $$(n_{z_1}, L, n_{z_{r_n}})$$

of the list $L(n)$, $$C_{n \to K}^{x_n, r_n} = \max_{(z_1, L, z_{r_n}) \subseteq L(n)} \left(\frac{x_n}{r_n}\sum_{j=1}^{r_n} H_n(z_j) + C_{(n+1) \to K}\right). \quad (4)$$

Using the induction hypothesis, it is known that the optimal placement scheme to optimize $C_{(n+1) \to K}$ only depends on the order of the accumulated hop distances of the available reduce slots and is independent of their exact values. Hence, under the optimal placement scheme, defining $q_{j,n}$ as the expected value of the size of the intermediate data fetched at the slot with the jth smallest accumulated hop distance in the optimal scheme of $C_{(n+1) \to K}$. Hence, $$C_{(n+1) \to K} = \sum_{j=1}^{l(n+1)} H_{n+1}(j) q_{j,n}. \quad (5)$$

Furthermore, since $q_{j,n}$ is independent of the values of the accumulated hop distances $H_n(j)$ and by the induction assumption $C_{(n+1) \to K}$ reaches its maximum, it follows that, using Hardy's lemma, $$q_{1,n} \geq q_{2,n} \geq L \geq q_{l(n+1),n}. \quad (6)$$

Now, using Equations (4), (5) and (6), and applying Hardy's lemma, there is obtained, if $q_{y,n} < x_n/r_n \leq q_{y+1,n}$, $$C_{n \to K}^{x_n, r_n} = \frac{x_n}{r_n}\sum_{j=y}^{y+r_n} H_n(j) + \sum_{j=1}^{y-1} H_n(j) q_{j,n} + \sum_{j=y+r_n+1}^{l(n+1)} H_n(j) q_{j,n}, \quad (7)$$

which is to assign the $r_i$ number of ReduceTasks to the slots indexed by $i_y, i_{y+1}, L, i_{y+R_i}$ in the list $L(n)$. This completes the induction.

In accordance with at least one embodiment of the invention, it can be recognized that the preceding result reveals the structure of the optimal placement, which is based on thresholds. The following theorem explains the procedure to calculate these thresholds. (Note that because of the assumption K $\bar{r} < r$, we can set the number $n_l$ of items in list $L(n)$ to be $n_l = (K-n+1)\bar{r}$ for $1 \leq n \leq K$.) First, define $F(x) @ Pr[X/R \leq x]$ and $\bar{F}(x) @ Pr[X/R > x]$.

Thence, in accordance with at least one embodiment of the invention, it can be recognized that by setting $q_{0,n}=\infty$, $q_{l(n+1),n}=-\infty$ for n=1, 2, L, K with $q_{0,K}=\infty$ and $q_{1,K}=-\infty$, there is the following recursion:

if $i>\bar{r}$, $$q_{i,n-1} = q_{i,n}F(q_{i,n}) + \sum_{j=1}^{\bar{r}} Pr[R=j]\left(\int_{q_{i,n}}^{q_{i-j,n}} y\,dF(y) + q_{i-j,n}\bar{F}(q_{i-j,n})\right)$$

if $1 \leq i \leq \bar{r}$, $$q_{i,n-1} = \left(\sum_{j=1}^{\bar{r}} Pr[R=j]\right)\int_{q_{i,n}}^{\infty} y\,dF(y) +$$

$$\sum_{j=1}^{i-1} Pr[R=j]\left(\int_{q_{i,n}}^{q_{i-j,n}} y\,dF(y) + q_{i-j,n}\bar{F}(q_{i-j,n})\right) + q_{i,n}F(q_{i,n})$$

where $-\infty\cdot 0$ and $\infty\cdot 0$ are defined to be 0.

In accordance with at least one embodiment of the invention, the preceding result can be used to recursively compute the values $q_{j,i}$. For instance, $$q_{j,K-1} = Pr[R \leq j]\int_0^{\infty} y\,dF(y),$$

where $1 \leq j \leq \bar{r}$.

To prove the theorem set forth just above, in accordance with at least one embodiment of the invention, one can first prove the result with the condition $i>\bar{r}$. Recall that $q_{j,n}$ is the expected value of the size of the intermediate data fetched at the slot with the jth smallest accumulated hop distance when the reduce placement is under the optimal scheme for jobs n+1, L, K.

In accordance with at least one embodiment of the invention, conditioning on the value of $X_i=u$, $R_i=v$, there can be explored $q_{i,n-1}$. Applying Hardy's lemma, it is known that the i'th slot in the list L(n−1) should be assigned to one ReduceTask of job n−1 if and only if $q_{i-v,n}>u/v \geq q_{i,n}$. This is because there is a need to insert v number of larger values after $q_{i-v,n+1}$, which covers the i'th position in the list $(q_{j,n})_{1 \leq j \leq l(n)}$. If $u/v<q_{i,n}$, then the i'th position will get an expected network transfer cost $q_{i,n}$ under the optimal policy, since the v number of values will be inserted after the i'th position in) $(q_{j,n})_{1 \leq j \leq l(n)}$. If $u/v>q_{i-v,n}$, this expected value is equal to $q_{i-v,n}$ since there will be v values larger than $q_{i-v,n}$ that need to be inserted in front of $q_{i-v,n}$. The other scenario $i \leq \bar{r}$ involves a corner case that needs to be taken care of separately, and it can be proved using similar arguments.

The disclosure now turns to a discussion of the assignment of sequential jobs for a stable system, in accordance with at least one embodiment of the invention. This represents a more realistic scenario when jobs can come and leave. It combines the study of a queuing system with the sequential stochastic assignment for ReduceTasks. In order to simplify the analysis, it can be assumed that $\{B_i\}$ is a sequence of i.i.d. exponential random variables and the jobs arrive according to a Poisson process with rate $\lambda$. For a sequence of jobs i, $-\infty<i<\infty$, denote by $W_q(i)$ the number of jobs in the queue and $W_s(i)$, $0 \leq W_s(i) \leq K$ the number of jobs in service observed by job i, respectively. For job i in service, $\Theta(i)=(i_1, L, i_R)$ is used to denote the indexes of the reduce slots occupied by job i where $i_j \in \{1, 2, L, r\}$. Let $\xi_i(j)$ be the index of the slot where the jth ReduceTask ($1 \leq j \leq R_i$) of job i is placed.

In accordance with at least one embodiment of the invention, it can be recognized that since exponential random variables are memoryless, one can use $S(i)=((\Theta(j), 1 \leq j \leq W_s(i)), W_q(i))$ to denote the state of the system observed by job i. An important class of policies is the so-called stationary ones. A policy is said to be stationary if the scheduling taken at any time only depends on the state of the system at that time, i.e., S(i) for job i. Precisely, a stationary policy is a deterministic function mapping the state information into a control action.

In accordance with at least one embodiment of the invention, it can be recognized that if $\lambda E[B]<1$ and $X_i^j$ are i.i.d. conditional on $R_i$, then under any stationary reduce placement policy, the following limit exists $$\bar{C} @ \lim_{n\to\infty} \frac{1}{n}\sum_{i=1}^{n}\sum_{j=1}^{R_i} X_i^j H(\xi_i(j)). \tag{8}$$

Figure 3:
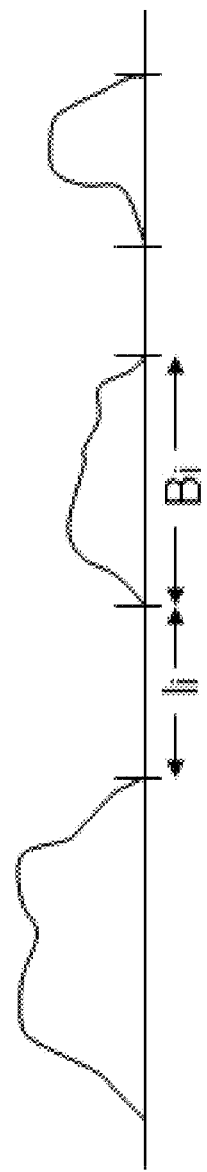
FIG. 3 graphically illustrates a renewal cycle.
Figure 4:
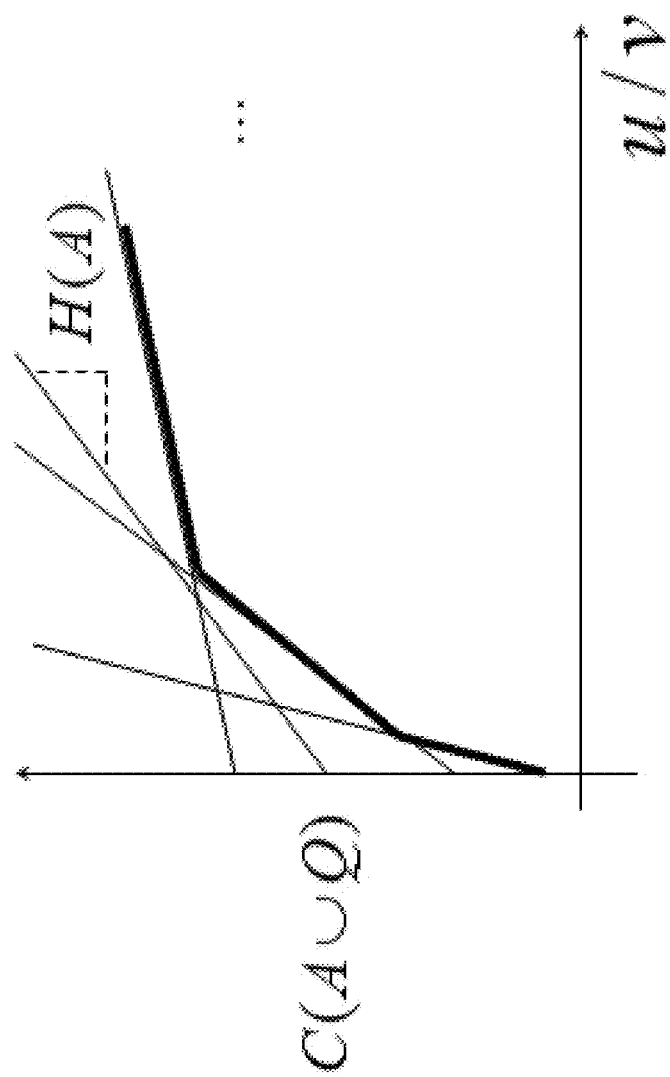
FIG. 4 graphically illustrates a minimum of a class of linear functions.

To prove the lemma set forth just above, in accordance with at least one embodiment of the invention, it is recognized that the above result is based on the property of renewal processes. A busy period is when the map queue has at least one job in service; an idle period is when the map queue does not have any running jobs. Since the map queue conducts K limited processor sharing (a work-conserving policy), it is known that the system alternates between idle $I_i$ and busy $B_i$ periods with the condition $\lambda E[B]<1$. Since the arrival follows a Poisson process, $\{I_i\}$ and $\{B_i\}$ form two independent i.i.d. random sequences, as shown in FIG. 3.

In accordance with at least one embodiment of the invention, denote by $C_m$ the total network transfer cost and by $N_m$ the number of jobs processed in the mth busy period, respectively. Since the placement policy is stationary, it is known that $\{C_m\}$ and $\{N_m\}$ are also two i.i.d. random sequences. Therefore, using the law of large numbers, there is obtained:

$$\lim_{n\to\infty}\frac{1}{n}\sum_{i=1}^{n}\sum_{j=1}^{R_i} X_i^j H(\delta_i(j)) = \lim_{m\to\infty}\frac{\sum_{i=1}^{m} C_m}{\sum_{i=1}^{m} N_m} \tag{9}$$

$$= \lim_{m\to\infty}\frac{\sum_{i=1}^{m} C_m}{m} \cdot \frac{m}{\sum_{i=1}^{m} N_m}$$

$$= \frac{E[C_1]}{E[N_1]}.$$

In accordance with at least one embodiment of the invention, the disclosure now turns to an investigation of an optimal placement scheme that assigns ReduceTasks on the nodes such that the long term average network transfer cost per job $\bar{C}$ is minimized. For a set S, denote by $S^P$ its power set, and by $S_k^P$ the subset of $S^P$ whose element each exactly contains k number of values. For $A \in \Psi^P$. with $\Psi=\{1, 2, L, r\}$, define $$H(A) @ \sum_{a \in A} H(a)$$

where H(a) is the accumulated hop distances of the slot with index a.

In accordance with at least one embodiment of the invention, it can be noted that the state $Q=((\Theta(j), 1 \le j \le W_s(i)), W_q(i))$ of the system observed by job i upon its arrival is from the state space $((\Theta(j), 1 \le j \le m_s, \Theta(j) \in \yen^P), m_q)$ where $m_q, m_s \in \yen \cup \{0\}$. Job i arrives and sees the set L(i) of available reduce slots; if |L(i)|=0 then job i needs to wait in the queue according to FIFO (first in first out) discipline. For a fixed v≥1, all the elements in $L(i)_v^P$ are sorted using the metric H(•) to form a list LL(i) according to increasing order when |L(i)|>0.

In accordance with at least one embodiment of the invention, it can be recognized that if $\lambda$ E[B]<1 and $R_i$=v, then, there exist $\infty = q_{0,i} \ge q_{1,i} \ge L \ge q_{|L(i)_v^P|+1,i} = -\infty$, such that when $q_{y,i} > X_i/R_i \ge q_{y+1,i}$ the optimal placement to minimize $\overline{C}$ is to assign the $R_i$ number of ReduceTasks to the slots indexed by the yth element in the list LL(i) when job i arrives.

In accordance with at least one embodiment of the invention, it can be noted that since all random variables follow exponential distributions, the above theorem implies that the process $((\Theta(j), 1 \le j \le W_s(i)), W_q(i))$ evolves according to a finite state Markov process if the optimal placement scheme (which is a threshold-based stationary policy) is applied.

To prove the theorem set forth just above, in accordance with at least one embodiment of the invention, let D be any element in the state space $((\Theta(j), 1 \le j \le m_s, \Theta(j) \in \yen^P), m_q)$. Since both {$B_i$} and {$A_i$} follow exponential distributions that have the memoryless property, we can define the optimal expected fetching cost C(D) starting from the system state D until the first time when the system becomes empty, i.e., at the end of the busy period. Since it is recognized that the expected number of jobs arriving during this period has a finite mean under the condition $\lambda$ E[B]<1, it is known that C(D) is finite and well defined.

In accordance with at least one embodiment of the invention, it can be noted that when job i arrives, it observes a state Q. Suppose $X_i$=u, $R_i$=v, then, the optimal policy is by finding $$\min_{A \in L(i)_v^P}(H(A)u/v + C(A \cup Q)), \quad (10)$$

where $A \cup Q$ means placing ReduceTasks on slots indexed by set A when observing the state Q. (Reference can be made here to FIG. 4 for a graphical illustration.) The value $H(A)u/v + C(A \cup Q)$ can be viewed as being evaluated at x=u/vv for a linear function $H(A)x + C(A \cup Q)$. Regarding the interception $C(A \cup Q)$ and the slope H(A) of these linear functions, one can prove the following result. For any $A_1, A_2 \in L(i)_v^P\$$, $\$H(A_1) \le H(A_2)$ implies $C(A_1 \cup Q) \ge C(A_2 \cup Q)$ and vice versa, i.e., $$H(A_1) \le H(A_2) \Leftrightarrow C(A_1 \cup Q) \ge C(A_2 \cup Q). \quad (11)$$

The preceding result prevails because if $H(A_1) < H(A_2)$, then exchanging all the indexes in set $A_1$ for the ones in $A_2$ can only increase the total expected fetching cost. The same arguments also apply in the reverse direction. Using Equation (11) and applying induction to the number of linear functions, one can finish the proof of this theorem.

It can be noted, in accordance with at least one embodiment of the invention, that in presence of job arrivals and departures, the optimal placement scheme is still a threshold based policy. However, the thresholds now depend on the accumulated hop distances and the arrival/departure rates, different from the policy calculated hereabove (involving Equations (1) through (7)) that only depends on $X_i$ and $R_i$. This dependency makes the computation of these optimal thresholds difficult. To ease the implementation, there can be provided provide a policy based on receding horizon control as described herebelow.

Generally, in accordance with at least one embodiment of the invention, there can be noted from the foregoing a theoretical framework to study the optimal placement policy under restricted assumptions, e.g., {$B_i$} have been assumed to be i.i.d. exponential random variables. The optimal policy is based on thresholds, which however involve complex computations that are not easy to implement. In real MapReduce clusters, the assignment decisions are made under other non-idealized conditions with practical engineering concerns. To this end, there is broadly contemplated herein a heuristic receding horizon control policy based on the insights obtained from previous analysis.

Figure 5:
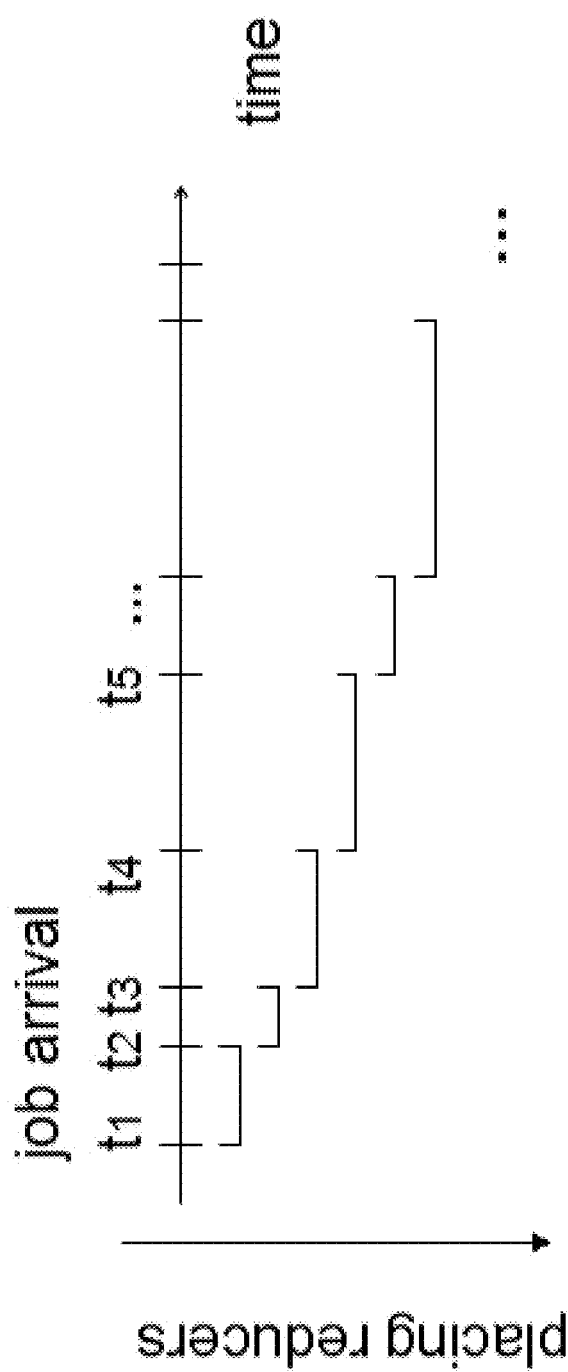
FIG. 5 graphically illustrates a receding horizon control policy.

It can be noted, in accordance with at least one embodiment of the invention, that a receding horizon control policy involves optimizing the ReduceTask placement of a newly arrived job by assuming that in the future only one more job that requires the same number of ReduceTasks will be submitted to the system before any other running job finishes, as illustrated in FIG. 5. As such, the receding horizon control policy is based on solving the optimal policy for K=2, i.e., a system with only two sequential jobs. Under the assumption that $A_i, B_i$ follow exponential distributions with rate $\lambda$ and $\mu$, it can be shown that the probability that the first job still has not finished when the second job arrives is equal to $p = \lambda/(\lambda + \mu) = \rho/(1+\rho)$ where $\rho = \lambda/\mu$. An optimal policy can then be found such that the expected fetching cost for these two jobs can be minimized. There can then be formulated the following stochastic optimization, by assuming $R_1 = R_2 = R$, $$\overline{C} = \min E\left[\sum_{j=1}^{R} X_1^j H(\xi_1(j)) + \sum_{j=1}^{R} X_2^j H(\xi_2(j))\right], \quad (12)$$

where $H(1) \le H(2) \le H(2) \le L$ denote the ordered list L of accumulated hop distance values.

In accordance with at least one embodiment of the invention, it can be noted that there are two reasons why there is postulated the condition $R_1 = R_2 = R$. First, in practice, the jobs arriving temporally close often exhibit positive correlations. For example, a number of HBase queries, each being a MapReduce job, are submitted to discover the answers related to the same topic; several large batch jobs, each with a different goal, need to provide statistic reports on log files collected on the same day. Therefore, in these scenarios the number of ReduceTasks of two jobs arriving sequentially may be close to each other. Secondly, a receding horizon control policy should be easy to implement in the real MapReduce system. It is desirable to avoid the complicated computation introduced by the recursive equations, e.g., as shown further above. As such, under the assumption $R_1 = R_2$, there can be shown a very simple form for the optimal policy that minimizes (12), as characterized by the following theorem.

In accordance with at least one embodiment of the invention, it can be noted that the optimal placement policy has a simple threshold-based structure: if $X_1 \ge R_1 \rho/(1+\rho)E[X/R]$, then assign the $R_1$ number of ReduceTasks to the slots indexed by 1, 2, L, $R_1$ when job 1 arrives; otherwise to $R_1+1$, $R_1+2$, L, $2R_1$. When job 2 arrives, it always takes the best $R_2$ slots from the available ones.

In order to prove the above theorem, in accordance with at least one embodiment of the invention, one can observe the following lemma. For a real-valued close set A and real numbers a, b, the linear function ax+by reaches the minimum within the set (x,y):x+y=n, x∈A only if |x−y| reaches the maximum. The proof is simply by observing that ax+by=(a− b)x+bn, which reaches its minimum when x is either the smallest or the largest value in A.

As such, in accordance with at least one embodiment of the invention, it can be noted that job 1 brings $X_1=u$, $R_1=v$ upon its arrival. Denote by $\overline{C}_{u,v}$ the minimal expected network cost conditional on $X_1=u$, $R_1=v$, i.e., $$\overline{C}_{u,v} = E\left[\sum_{j=1}^{R} X_1^j H(\xi_1(j)) + \sum_{j=1}^{R} X_2^j H(\xi_2(j)) \middle| X_1 = u, R_1 = v\right].$$

In accordance with at least one embodiment of the invention, suppose that one assigns job 1 to the nodes indexed by $B=\{i_1, i_2, L, i_v\}$. When job 2 arrives, it sees job 1 still running in the system with probability $p=\lambda/(\lambda+\mu)$ and sees an empty system with probability $\mu/(\lambda+\mu)=1-p$. If job 1 has not finished yet, then job 2 has no other choices and can only choose the slots in $B^C$, where $B^C$ is the complement of B in $\{1, 2, L, 2v\}$. Otherwise, job 2 can allocate its ReduceTasks to the best slots. Using the aforementioned arguments, there is obtained:

$$\overline{C}_{u,v} = \quad (13)$$
$$u/v\left(\sum_{j\in B} H(j)\right) + pE[X/R]\left(\sum_{j\in B^C} H(j)\right) + (1-p)E[X/R]\left(\sum_{j=1}^{v} H(j)\right).$$

Therefore, applying the lemma noted just above, one obtains that $\overline{C}_{u,v}$ reaches its minimum only if $$\left|\left(\sum_{j\in B} H(j)\right) - \left(\sum_{j\in B^C} H(j)\right)\right|$$

attains its maximum, implying that B can be only equal to $\{1, 2, L, v\}$ or $\{R+1, R+2, L, 2+v\}$.

In accordance with at least one embodiment of the invention, again, applying Hardy's lemma, it is known that the optimal policy is based on the relative relationship between u/v and pE[X/R]: if $u/v \geq pE[X/R]$ then $B=\{1, 2, L, v\}$; otherwise $B=\{R+1, R+2, L, 2v\}$. This finishes the proof of the theorem.

In accordance with at least one embodiment of the invention, there can now be described an implementation of this placement policy. Since the policy only involves a single threshold $\rho/(1+\rho)E[X/R]$, one needs to estimate $\rho$ and E[X/R]. In recognizing the fact that workload statistics are usually time-varying, e.g., depicting the peak and off-peak hours during a day, one can resort to an adaptive dynamic control policy that constantly updates the estimates of the two required parameters.

Specifically, it can be noted, in accordance with at least one embodiment of the invention, that upon the arrival of a new job i, there can be observed the number $N_i$ of jobs present in the system, the number $R_i$ v of ReduceTasks and the total amount $X_i$ of intermediate data that will be generated by job i. There can be maintained a list $W=(w_1, w_2, L, w_\tau)$, $w_j=(n_j, x_j, r_j)$, $1 \leq j \leq \tau$ of size $\tau$ to record the latest $\tau$ observations $(N_i, X_i, R_i)$. Then, there are updated the following estimates of the average queue length $\overline{N}$ and the average intermediate data per ReduceTask $\overline{X/R}$, $$\overline{N} = \frac{1}{\tau}\sum_{j=1}^{\tau} n_j, \quad \overline{X/R} = \frac{1}{\tau}\sum_{j=1}^{\tau} x_j/r_j,$$

where $\overline{N}$ and $\overline{X/R}$ can be initially set to $N_1$ and $X_1/R_1$.

In accordance with at least one embodiment of the invention, by way of a well-known queuing result, it is known that $EN=\rho/(1-\rho)$, implying $p=\rho/(1+\rho)=\overline{N}/(2\overline{N}+1)$. An assignment policy then follows as described hereinabove, thereby immediately placing the arriving job's ReduceTasks.

Figure 6:
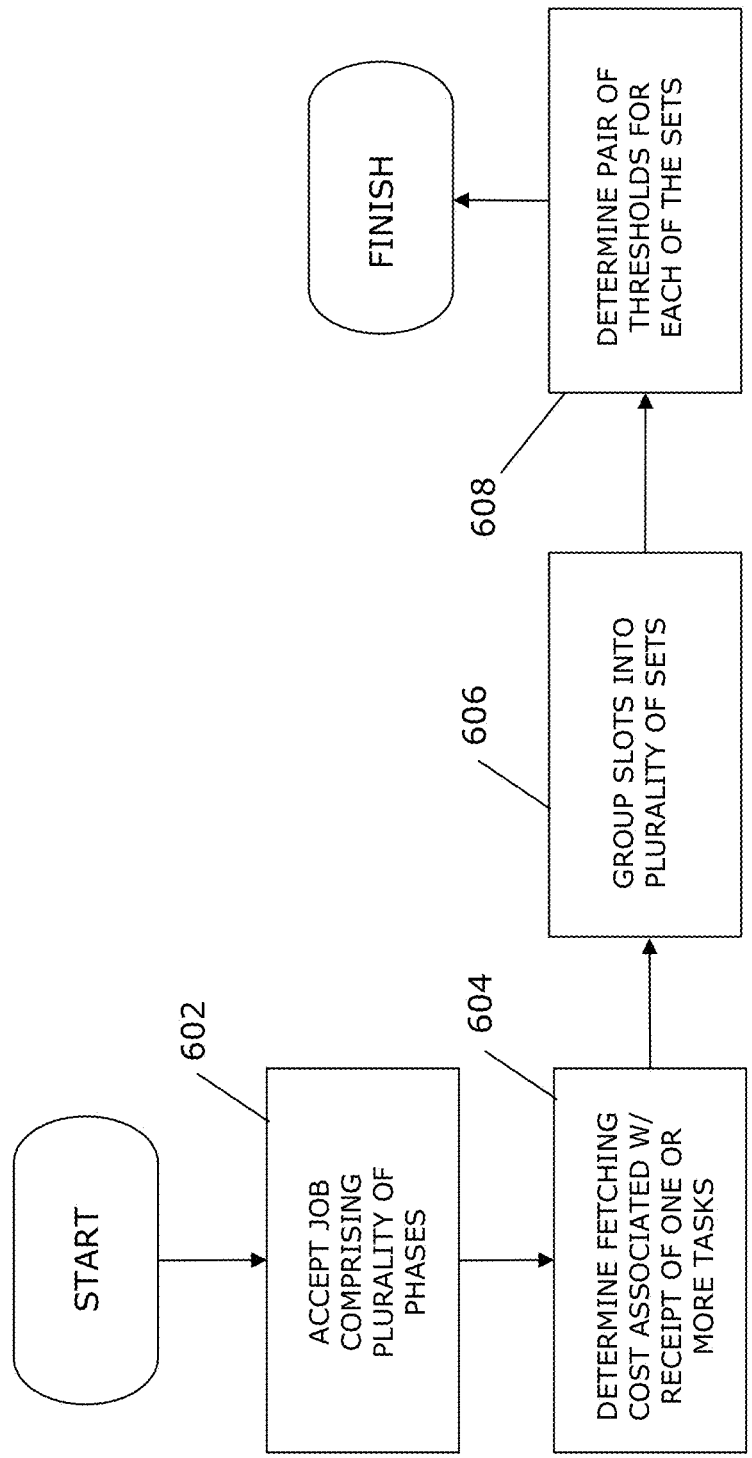
FIG. 6 sets forth a process more generally for task scheduling.

FIG. 6 sets forth a process more generally for task scheduling, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, a job is accepted, the job comprising a plurality of phases, each of the phases comprising at least one task (602). For each of a plurality of slots, a fetching cost associated with receipt of one or more of the tasks is determined (604). The slots are grouped into a plurality of sets (606). A pair of thresholds is determined for each of the sets, the thresholds being associated with the determined fetching costs and comprising upper and lower numerical bounds for guiding receipt of one or more of the tasks (608).

Figure 7:
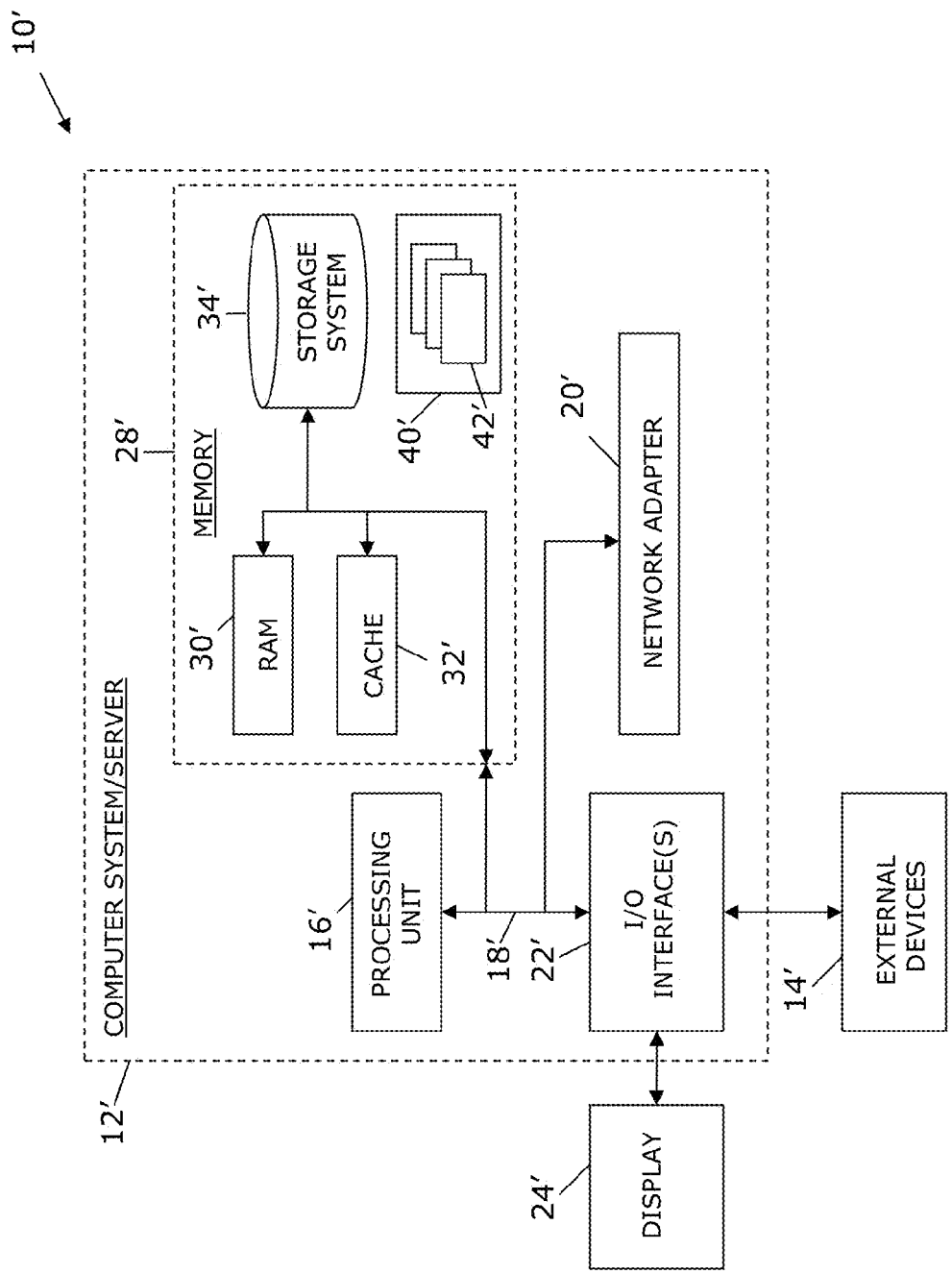
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7 computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    accepting, using a processor, a job, the job comprising a plurality of phases including map and reduce phases, each of the phases comprising at least one task;
    determining, using a processor, for each of a plurality of slots corresponding to the reduce phases, a fetching cost associated with receipt of one or more of the tasks;
    grouping, using a processor, the slots into a plurality of sets;
    for each of the sets, setting, using a processor, upper and lower numerical bounds for guiding receipt of one or more of the tasks, the upper and lower bounds for each set being associated with the determined fetching costs;
    estimating, using a processor, an intermediate data size of the job;
    determining, using a processor, a ratio of the intermediate data size to a number of reduce tasks associated with the job;
    determining, using a processor, a set wherein the ratio falls between the upper and lower numerical bounds associated with the set; and
    assigning, using a processor, the one or more of the tasks to the determined set wherein the ratio falls between the upper and lower numerical bounds.

2. The method according to claim 1, wherein the map and reduce phases are at least partially overlapping with respect to one other.

3. The method according to claim 1, wherein said assigning comprises applying a receding horizon control policy.

4. The method according to claim 3, wherein the receding horizon control policy minimizes an expected fetching cost for two sequential reduce tasks.

5. An apparatus comprising:
    at least one processor; and
    a computer readable storage medium having computer readable program code embodied therewith and executable by the at least one processor, the computer readable program code comprising:
    computer readable program code configured to accept a job, the job comprising a plurality of phases including map and reduce phases, each of the phases comprising at least one task;
    computer readable program code configured to determine, for each of a plurality of slots corresponding to the reduce phases, a fetching cost associated with receipt of one or more of the tasks;
    computer readable program code configured to group the slots into a plurality of sets;
    computer readable program code configured to, set upper and lower numerical bounds for guiding receipt of one or more of the tasks, the upper and lower bounds for each set being associated with the determined fetching costs; and
    computer readable program code configured to:
    estimate an intermediate data size of the job;
    determine a ratio of the intermediate data size to a number of reduce tasks associated with the job;
    determine a set wherein the ratio falls between the upper and lower numerical bounds associated with the set; and
    assign the one or more of the tasks to the determined set wherein the ratio falls between the upper and lower numerical bounds.

6. A computer program product comprising:
    a non-transitory computer readable storage medium having computer readable program code embodied therewith, the computer readable program code comprising:
    computer readable program code configured to accept a job, the job comprising a plurality of phases including map and reduce phases, each of the phases comprising at least one task;
    computer readable program code configured to determine, for each of a plurality of slots corresponding to the reduce phases, a fetching cost associated with receipt of one or more of the tasks;
    computer readable program code configured to group the slots into a plurality of sets;
    computer readable program code configured to, set upper and lower numerical bounds for guiding receipt of one or more of the tasks, the upper and lower bounds for each set being associated with the determined fetching costs; and computer readable program code configured to:
estimate an intermediate data size of the job;
determine a ratio of the intermediate data size to a number of reduce tasks associated with the job;
determine a set wherein the ratio falls between the upper and lower numerical bounds associated with the set; and
assign the one or more of the tasks to the determined set wherein the ratio falls between the upper and lower numerical bounds.

7. The computer program product according to claim 6, wherein the map and reduce phases are at least partially overlapping with respect to one other.

8. The computer program product according to claim 6, wherein said computer readable program code is configured to assign at least one reduce task via applying a receding horizon control policy.

9. The computer program product according to claim 8, wherein the receding horizon control policy minimizes an expected fetching cost for two sequential reduce tasks.

* * * * *